March 2, 1943.   I. JEPSON   2,312,556
COFFEE MAKER
Original Filed Oct. 27, 1938
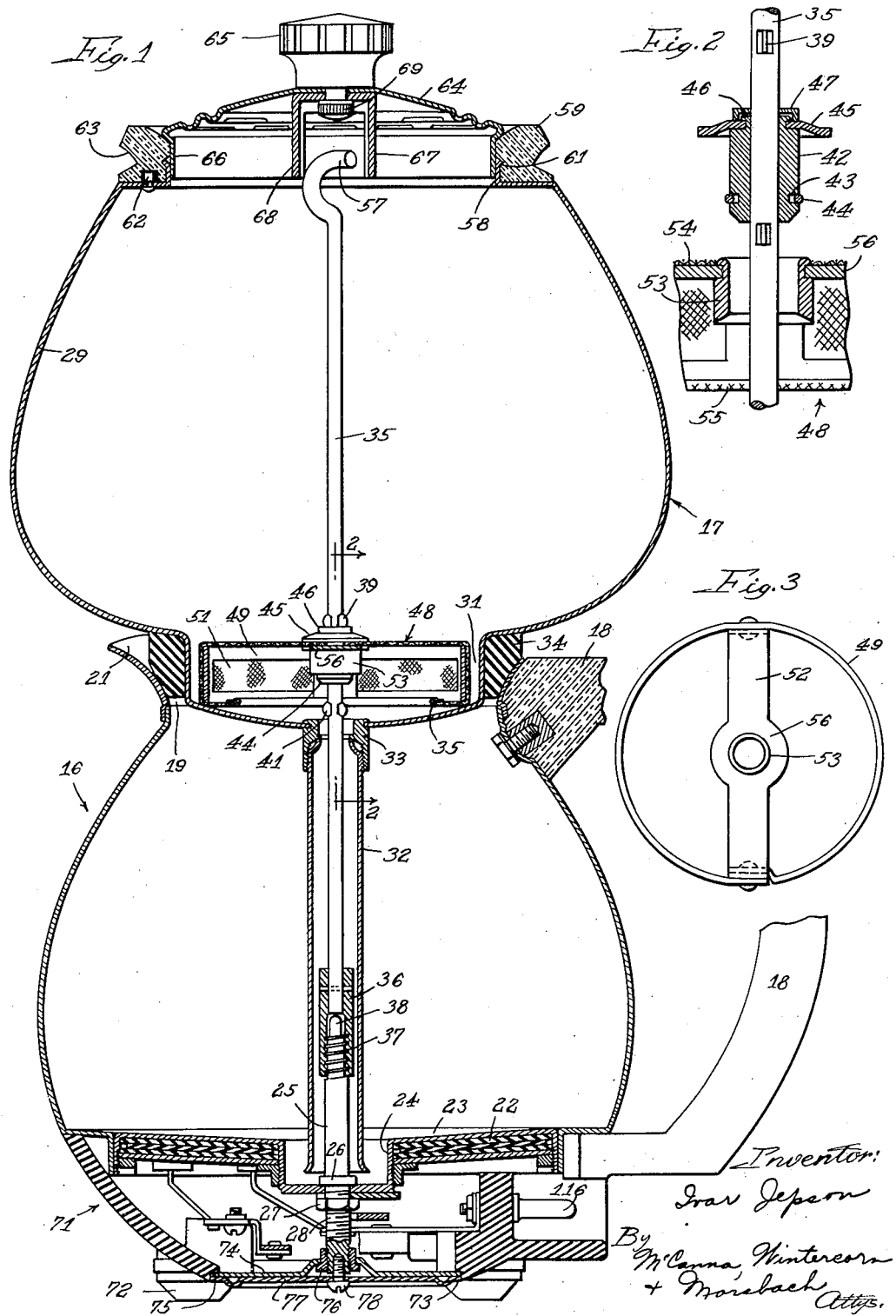

Patented Mar. 2, 1943

2,312,556

UNITED STATES PATENT OFFICE 2,312,556

COFFEE MAKER

Ivar Jepson, Chicago, Ill., assignor to Chicago Flexible Shaft Company, Chicago, Ill., a corporation of Illinois Original application October 27, 1938, Serial No. 237,247. Divided and this application September 11, 1939, Serial No. 294,306

14 Claims. (Cl. 53—3)

This invention relates to coffee makers, and has special reference to coffee makers such as the vacuum type wherein water is heated in one container and transferred to another and returned during the making operations.

An object of the invention is the provision of a vacuum type coffee maker having improved means for securing the containers together.

Another object of the invention is to provide a vacuum type coffee maker having improved filter means.

Another object of the invention is to provide a unit of assembly including a filter and a fastening means of unique construction and function for securing the containers together and also for securing the filter in its operative position and for permitting quick and easy disassembly of the parts and replacement of the filter element.

A still further object of the invention is the provision of a coffee maker having an improved coffee container bowl.

A further object of the invention is the provision of improved means for handling the containers and improved means for actuating the securing means.

Another object of the invention is to provide an improved filter and means coacting with the filter to clamp it in working position and also to clamp the upper coffee container on the lower liquid containing pot, the clamping means further coacting with the filter to permit unfastening of the container and the pot without unseating the filter.

Other objects and advantages will appear from the following description and the accompanying drawing, in which—

Figure 1 is a vertical section through a coffee maker embodying the invention;

Fig. 2 is a fragmentary section through the filter mechanism on the line 2—2 of Figure 1, and Fig. 3 is a top view of the strainer frame.

This is a division of my copending application Serial No. 237,247, filed October 27, 1938, entitled "Coffee maker."

The invention is directed primarily to vacuum type coffee makers and others operating an analogous principles, that is, by the displacement of water from the coffee pot into another container or another section of the container and its subsequent return to the pot. There are, however, certain phases of the invention which may not be directly limited to such construction. The device herein shown is a vacuum type coffee maker having a heating or coffee pot indicated generally by the numeral 16 and a coffee container or bowl designated generally by the numeral 17. In this instance the pot and bowl are of metal, but the invention is obviously not limited to this type of construction. The pot 16 has a handle 18 and an open top 19 surrounded by a pouring lip and spout 21 so that the pot may serve in the serving of coffee. The open top of the pot in the serving function thereof may be covered by a closure, as will presently be described. The bottom of the pot carries a heating element 22 and is sloped slightly, as shown at 23, toward a central well 24. Positioned in the bottom of the well 24, and substantially at its center is an upstanding stud 25 having a flange 26 bearing against the bottom of the well and a nut 27 on the exterior of the container engaging a lower threaded portion 28 of the stud to secure the same in position in the pot.

The bowl 17 consists of a symmetrical portion 29 having a bottom well 31 terminating in a displacement tube 32, the interior of which communicates with the interior of the bowl. The tube 32 is advantageously threaded into a threaded boss 33 carried in the bottom of the well 31 so as to be removable for cleaning purposes. The tube 32 terminates at its lower end within the well 24 of the pot below the level of the main body thereof and preferably below the level of the heating element 22, and serves to conduct water from the interior of the pot 16 upward into the bowl when displaced by steam pressure within the pot. A rubber or similar gasket 34 is positioned around the exterior of the well 31 and is shaped to seat in the open top of the pot 16, as best shown in Figure 1 for the purpose of producing a steam-tight joint between the bowl and the pot. For the purpose of fixedly securing the bowl and the pot together, compressing the gasket 34, and retaining the filter in place, a rod 35 is provided of a length to extend from the upper end of the bowl 17 to a point adjacent the lower end of the pot 16, as shown in Figure 1. The lower end of the rod 35 has an internally threaded sleeve 36 adapted to engage threads 37 on the upper end of the stud 25, the upper end of the stud having a pilot point 38 for guiding the sleeve into engagement with the threads 37. Intermediate its ends the rod is provided with spaced abutments 39 and 41 between which is slidably positioned on the rod a collar 42. The collar has an annular groove 43 within which is seated a split ring 44, and spaced therefrom adjacent the opposite end of the collar 42 is an annular flange 45, a portion of the collar being spun over as shown at 46 to secure the flange in place. A washer 47 likewise loose on the rod 35, is positioned between the collar 42 and the abutment 39 for the purpose of facilitating the rotation of the rod with respect to the collar 42.

The collar 42 and associated parts serve to support a filter and filter frame designated generally by the numeral 48. This consists of a disk-like structure having cylindrical side walls 49 provided with peripheral slots 51 and a transverse member 52 extending diametrically between the cylindrical side walls, the transverse member having an axial opening within which is fixedly secured a cylindrical supporting element 53, the interior diameter of which is such as to closely receive the collar 42. The distance between the split ring 44 and the flange 45 is slightly greater than the length of the cylindrical supporting member 53 so that when the collar is received therein, the flange 45 rests against the upper face of the frame, and the split ring 44 rests against the lower end of the cylindrical member 53, thus retaining the filter frame in position on the collar but permitting rotation of the rod with respect to the frame and also rotation of the rod with respect to the collar 42. The frame is covered by a filter cloth 54 of conventional material in the form of a disk, the peripheral edges of which are gathered below the frame by means of a drawstring or the like, as shown at 55. The filter cloth has a central opening for the passage of the collar 42 therethrough but of such size that the flange 45 engages the periphery of the opening and binds it against an enlarged portion 56 of the transverse frame member 52, as will be seen from Figs. 2 and 5. The upper end of the rod 35 is bent transversely of its length as shown at 57 in the plane of the upper end of the bowl 17 through which the rod 35 is rotated. From this structure it will be seen that when the bowl 17 is positioned on the pot 16, the rod 35 with the attached filter may be inserted through the top of the bowl 17, the sleeve 36 passing down through the tube 32 into engagement with the upper end of the stud 25. Thereupon rotation of the rod 35 causes the rod to move downward so that the shoulder 39 engages the washer 47, the washer 47 engages the flange 45, the flange 45 engages the filter cloth and frame, and the periphery of the frame and cloth engages against the bottom of the well 38. The rod 35 is rotated until the parts are drawn up tightly, thus compressing the gasket 34 and rigidly securing the parts in position. Because of the manner in which the filter and filter frame are removably secured to the rod 35, the cloth is easily removed for cleaning or replacement and the parts are easily disassembled for access to all parts of the device during the cleaning operation.

It will be observed that the collar 42 which constitutes a filter supporting part is freely rotatable as well as slidable axially on the rod between the abutments 39 and 41. These abutments confine the filter supporting part so that when the filter parts are in operative condition they constitute with the rod a unit of assembly which can be removed, replaced, and cleaned as such. The free rotation of the rod in the collar enables clamping not only of the coffee bowl in the heating pot, but clamping of the filter supporting frame against the bottom of the coffee bowl, to thus firmly compress and hold these parts in the desired coacting relation. The limited sliding of the collar 42 on the rod is primarily for the purpose of permitting the rod to be unscrewed from its bottom connection without unseating the filter. Thus, the spacing of the abutments 39—41 with respect to the coacting parts serves to allow the rod to be unscrewed while the filter remains in its seated position, thereby preventing the ground coffee from passing down into the tube and into the coffee liquid at the time of removing the upper container. The sliding movement of the rod in the collar 42 also serves the purpose of giving access to this portion of the rod for cleaning and as a means to prevent accumulations of foreign matter in the rod bearing.

The upper end of the bowl 17 has a top opening 58 which is provided with an annular ring 59 of insulation material such as a molded plastic material secured in position by a vertically disposed flange 61 of the bowl and a pin 62. The ring 59 may advantageously be provided with an annular groove 63 for the purpose of producing a gripping surface for the fingers of the operator in removing the bowl from the pot. A closure member 64 having a knob 65 of insulation material and a depending flange 66 is adapted to seat in the open top of the bowl, the open top being of substantially the same size as the open top 19 of the pot so that the closure 64 may be interchangeably used on the bowl and on the pot. A channel member having depending flanges 67 and 68 is axially positioned on the lower side of the closure 64 by means of a screw 69 or otherwise, the flanges 67 and 68 being of such depth as to rest within the plane of the end 57 of the rod 35 so that upon rotation of the closure 64 the rod 35 may be rotated by contact with the flanges 67 and 68. Through this means at the conclusion of the coffee making operations, the operator may disengage the rod 35 from the stud 25 by rotation of the knob 65 and remove the bowl from the pot by grasping the ring 59. In this way it is unnecessary for the operator to come into contact with heated portions of the device for the purpose of disengaging the rod 35 and removing the bowl.

Directing attention now more particularly to the structure for controlling the operation of the coffee maker, (which is more particularly described in my application Serial No. 237,247 of which this is a division), the pot 16 has a base designated generally by the numeral 71, formed in this instance of insulation material such as a molded plastic and having legs 72 for supporting the pot to provide ventilation below the same. The lower side of the base has an opening 73 closed by means of a plate 74 which abuts against a shoulder 75 of the base at its periphery. The center of the plate is drawn upward by means of a nut 76 engaging the threaded portions 28 of the stud 25, thereby securing the base to the bottom of the pot. The plate 74 and the nut 76 are covered by a decorative plate 77 held in place by a screw 78 threaded into the end of the stud 25. Current is conducted from terminal pins 116 to the heating element through thermostat control mechanism which functions to control said element through two stages—a coffee making stage, and a coffee warming stage as described in said application.

The operation of the device is as follows: The requisite amount of water is placed in the pot 16 and the bowl 17, together with the filter 48 and rod 35, are positioned in the pot, the upper end 57 of the rod being rotated by the fingers to tighten the two containers together as heretofore described. This operation compresses the gasket 34 and bring the lower end of the tube 32 into fixed operative position with respect to the well 24. The indicated amount of ground coffee is then placed in the bowl 17 and the heating coil 22 energized as described in my above-mentioned application. The coffee making operation then proceeds as described in said application, and some time after the conclusion thereof the bowl and filter mechanism are removed by rotating the knob 65 to unscrew the rod 35, and by grasping the ring 59 which, regardless of the temperature condition of the bowl 17, will be at such temperature that the operator can comfortably handle the same. When the bowl is removed, the closure 64 is seated on the top of the pot 16 and the coffee is ready to serve.

It will be seen that I have provided novel means for securing the pots together, together with novel means for actuating the same. Another feature of the invention is the structure of the filter mechanism. I have also provided a novel arrangement of coffee container facilitating its handling during the coffee making operations.

I am aware that numerous alterations and changes may be made in the specific construction disclosed, and I do not wish to be limited except as required by the prior art and the appended claims.

I claim:

1. The combination in a vacuum type coffee maker of an open top heating pot, an open top coffee bowl adapted to seat in the open top of said pot, said bowl having a depending tube for movement of liquid between the pot and the bowl, a filter frame adapted to seat against the bottom of the bowl spanning the end of said tube, said frame having a marginal portion adapted to seat against the bottom of the bowl and an axially disposed sleeve, a rod extending through said sleeve to a point adjacent the bottom of said pot, said rod having a freely rotatable collar thereon adapted to be received within said axial sleeve to releasably secure the filter frame to said rod and to apply pressure to the frame from said rod, and complementary screw threaded means on the lower end of the rod and on the pot for urging the collar against the frame and the frame against the bowl to secure the bowl, frame and pot together.

2. The combination in a vacuum type coffee maker, of an open top heating pot, an open top coffee bowl adapted to seat in the open top of said pot, said bowl having a depending tube for movement of liquid between the pot and bowl, means extending through said tube for securing the pot and bowl together, means on the upper end of said securing means for operating the latter to fasten and unfasten the pot and bowl, and a removable closure for the open top of the coffee bowl having attached thereto manually operable means coacting with said means on the upper end of the securing means and operable by rotative movement of the closure relative to the coffee bowl to fasten and unfasten the pot and bowl.

3. The combination set forth in claim 2, in which the top closure is shaped to fit the open top of the heating pot and the coffee bowl, respectively, and in which the manually operable means on the closure is detachably engageable with the operable means at the upper end of the securing means.

4. The combination in a vacuum type coffee maker, of an open top heating pot, an open top coffee bowl adapted to seat in the open top of the heating pot and having a depending tube for movement of heated liquid between the heating pot and the coffee bowl, a rod extending through said tube and having detachable screw connection with the heating pot, means coacting between the rod and the coffee bowl whereby the rod is rotatable in one direction to fixedly secure the coffe bowl in its seated position on the heating pot and rotatable in the opposite direction to disconnect and permit removal of the coffee bowl from the heating pot, the rod being removable from the coffee bowl, a coffee filter held in operative position in the bottom of the coffee bowl by means of the rod and removable from said position by removal of the rod, and a closure for the open top of the coffee bowl having means detachably coacting with the upper end of the rod and adapted to be operated by rotation of the closure with respect to the coffee bowl for connecting and disconnecting the rod from the heating pot.

5. The combination in a vacuum type coffee maker, of a lower heating container, an upper coffee container adapted to seat on the lower container and having a depending tube adapted for movement of liquid between the containers, a rod extending through the tube and having a screw thread connection at its lower end with the lower container and a handle at its upper end operable for rotating the rod in fastening and unfastening operations, fixed abutments axially spaced medially on the rod, a collar freely rotatable on the rod between said abutments, a filter element, and supporting means for replaceably holding said filter element and adapted to be clamped against a bottom portion of the upper container including means coacting between the collar and the filter supporting means to impose axial thrust against said supporting means by rotation of the rod to clamp said supporting means downwardly against the upper container and to thereby clamp the upper container downwardly against its seat on the lower container.

6. The combination in a vacuum type coffee maker, of a lower heating container; an upper coffee container adapted to seat on the lower container and having a depending tube adapted for movement of liquid between the containers; a rod extending through the tube and having a locking connection at its lower end with the lower container and means at its upper end operable for fastening and unfastening said locking connection; fixed abutments axially spaced medially on the rod; and filter means comprising a filter element, a part freely rotatable on the rod and retained thereon between said abutments, and a part adapted to be slipped over one end of the rod and over the adjacent abutment and coacting with the first mentioned part to support the filter element in operative position on the rod, the rod being rotatable in a fastening operation to clamp the filter means against the upper container and thereby to clamp the upper container against its seat on the lower container.

7. The combination set forth in claim 6, including means coacting between the first and second mentioned filter supporting parts for establishing quick detachable connection between said parts.

8. The combination set forth in claim 6, including a yieldable holding element carried by one of said filter supporting parts and adapted to yieldingly engage and disengage the other filter supporting part to maintain said parts in cooperative relation and to permit quick detachment of one part with respect to the other.

9. The combination as set forth in claim 6, in which the filter means includes means operable to effect quick connection and disconnection of one of the filter supporting parts with respect to the other.

10. In a vacuum type coffee maker, in combination, an open top heating pot, a coffee bowl adapted to seat in the top of said pot and having a depending tube for passage of heated liquid between the pot and the bowl, means for detachably securing the bowl in operative position on the pot including a rod extending through the tube and detachably connected at its lower end to the bowl, a coffee filter adapted to be held in the bowl in a position to filter said heated liquid in its passage between the pot and the bowl including a filter element adapted to seat directly against the bowl continuously around the peripheral portion of the filter, means connecting the coffee filter to the rod so that the rod and the filter constitute a unit of assembly removable and replaceable as such with respect to the pot and the bowl, the coffee filter being held seated in said filter position by means of said rod and said rod being freely rotatable in said filter, means at the upper end of the rod manually operable to rotate the rod with respect to the filter when said unit is in the filter position, and means effective upon said rotation of the rod to apply increasing pressure against the filter to increasingly clamp its filter element against its seat on the bowl, the filter being in such coaction with the bowl through said filter element that said increasing pressure is applied to the bowl to thereby increasingly clamp the bowl against its said seat without rotating the filter wtih respect to the bowl.

11. The combination in a vacuum type coffee maker, of a lower heating container, an upper coffee container adapted to seat on the lower container and having a depending tube adapted for movement of liquid between the containers, a rod extending through the tube and having a screw thread connection at its lower end with the lower container and a handle at its upper end operable for rotating the rod in fastening and unfastening operations, fixed abutments axially spaced medially on the rod, a collar axially and rotatably movable on said rod between said abutments, a filter frame adapted to seat in a bottom portion of the upper container, a filter element replaceably carried on the filter frame, and means coacting between the filter frame and the collar to clamp the filter frame downwardly against its seat and thereby to clamp the upper container downwardly against the lower container by turning the rod in one direction and to unclamp said parts by turning the rod in the opposite direction, the filter frame having a quick releasable connection with the collar for removal of the filter frame therefrom when the rod is unfastened.

12. In a vacuum type coffee maker, an open top heating pot, a coffee bowl adapted to seat on the heating pot and having a depending tube for movement of liquid between the pot and the bowl, removable filter means adapted to seat in the bottom of the bowl to retain ground coffee from passing into said tube, a rod threaded to the bottom of the heating pot, extending upwardly through the tube and the filter means and operable from above said filter means to tighten said threaded connection when rotated in one direction and to loosen it when rotated in the opposite direction, the rod being freely rotatable in the filter means, and means coacting between the rod and the filter means to impart downward thrust against the filter means to increasingly urge it against its said seat in response to rotation of the rod in the first mentioned direction and to increasingly urge the bowl against its said seat through downward pressure applied through the filter means without rotation of said filter means, said coacting means providing for axial movement of the rod upwardly with respect to the filter means in response to rotation of the rod in the second mentioned direction so as to permit unfastening of the threaded connection without disturbing the sealing position of the filter means in the bottom of the coffee bowl.

13. The combination in a vacuum type coffee maker, of a lower heating container, an upper coffee container adapted to seat on the lower container and having a depending tube adapted for movement of liquid between the containers, a rod extending through the tube and having a screw thread connection at its lower end with the lower container and being operable at its upper end for rotation in one direction to tighten said screw connection and in the opposite direction to loosen said connection, filter means seated in the bottom of the coffee container to retain ground coffee from passing into said tube, the rod passing through said filter means and being freely rotatable therein and having fixed abutments one above the filter means and another below said filter means, and means coacting between said abutments and said filter means constructed and arranged so that the upper abutment imparts downward thrust against the filter means to increasingly urge it against its said seat when the rod is turned in a direction to tighten said screw thread connection and the lower abutment is located to allow withdrawal movement of the rod with respect to the filter means when the rod is turned in the opposite direction to unfasten the screw connection.

14. In a vacuum type coffee maker, an open top heating pot, a coffee bowl adapted to seat on the heating pot and having a depending tube for movement of liquid between the pot and the bowl, removable filter means adapted to seat against a bottom portion of the coffee bowl to retain ground coffee from passing into said tube, clamping means having a helical connection at its lower end with the heating pot and extending upwardly to the filter means and being operable at its upper end for rotation in one direction to tighten said helical connection and in the opposite direction to loosen said connection, said clamping means being freely rotatable in the filter means, and means coacting between the clamping means and the filter means to impart thrust against the filter means to increasingly clamp it against its said seat when the clamping means is turned in the first mentioned direction and providing axial movement of the clamping means with respect to the filter means in response to movement of the clamping means in said opposite direction for unfastening said connection without unseating the filter means.

IVAR JEPSON.